United States Patent Office 3,378,548
Patented Apr. 16, 1968

3,378,548
16β-ALKYLTHIO-17β-HYDROXY-STEROIDS AND 17-ACYLATES THEREOF
Taichiro Komeno, Osaka, and Norio Tokutake, Kobe, Japan, assignors to Shionogi & Co., Ltd., Osaka, Japan
No Drawing. Filed Mar. 1, 1963, Ser. No. 262,213
Claims priority, application Japan, Mar. 20, 1962, 37/11,348
14 Claims. (Cl. 260—239.55)

The present invention relates to steroid and production thereof. More particularly, it relates to 16β-alkylthio-17β-hydroxy-steroid and its 17-acylate and production thereof.

The process of the present invention is substantially representable by the following scheme:

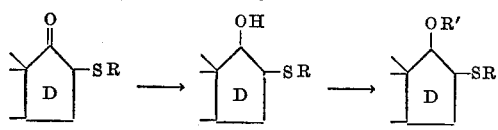

wherein R is a lower alkyl group (e.g. methyl, ethyl, propyl, butyl, pentyl, hexyl) and R' is a lower alkanoyl group (e.g. acetyl, propionyl, butyryl, valeryl).

The process is generally applicable to the conversion of a 16β-alkylthio-17-oxo-steroid into the corresponding 16β-alkylthio-17β-hydroxy-steroid or its acylate. Especially, its application to the 16β-alkylthio-17-oxo-steroid represented by the formula:

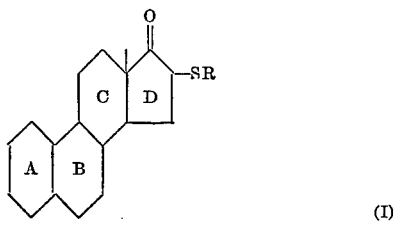

wherein R has the same significance as designated above and a substituent(s) such as hydroxyl, lower alkanoyloxy (e.g. acetyloxy, propionyloxy, butyryloxy), oxo, lower alkylenedioxy (e.g. ethylendioxy, propylenedioxy), lower alkyl (e.g. methyl, ethyl, propyl) and lower alkoxy (e.g. methoxy, ethoxy, propoxy) and less than 4 double bond(s) can be present on the A-ring and the A- and B-rings, respectively, gives a 16β-alkylthio-17β-hydroxy-steroid or its acylate represented by the formula:

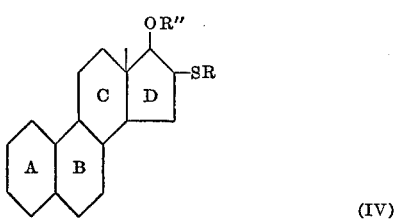

wherein R" is a hydrogen atom or a lower alkanoyl group (e.g. acetyl, propionyl, butyryl, valeryl), R has the same significance as designated above and a substituent(s) such as hydroxyl, lower alkanoyloxy (e.g. acetyloxy, propionyloxy, butyryloxy), oxo, lower alkylenedioxy (e.g. ethylenedioxy, propylenedioxy), lower alkyl (e.g. methyl, ethyl, propyl) and lower alkoxy (e.g. methoxy, ethoxy, propoxy) and less than 4 double bond(s) can be present on the A-ring and the A- and B-rings, respectively, which may possess physiological activities. Accordingly, the process of the present invention will be hereinafter illustrated taking its application to the said 16β-alkylthio-17-oxo-steroid (I) as an example. However, it should be understood that the scope of the present invention is not limited only to the application of the process to the said 16β-alkylthio-17-oxo-steroid (I).

When the process of the present invention invention is applied to the 16β-alkylthio-17-oxo-steroid (I), the conversion may be substantially represented by the formula:

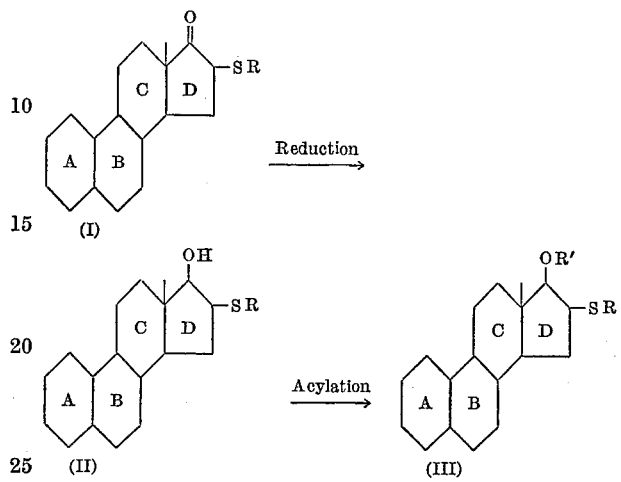

wherein R and R' each has the same significance as designated above and a substituent(s) such as hydroxyl, lower alkanoyloxy (e.g. acetyloxy, propionyloxy, butyryloxy), oxo, lower alkylenedioxy (e.g. ethylenedioxy, propylenedioxy), lower alkyl (e.g. methyl, ethyl, propyl) and lower alkoxy (e.g. methoxy, ethoxy, propoxy) and less than 4 double bond(s) can be present on the A-ring and the A- and B-rings, respectively. In this connection, it would be understood that the foregoing formulae show the substantial order of the steps in the production, modifications and equivalents—including possible detours—being omitted. Thus, when the free oxo group, if any, present on the A-ring is unfavorably affected in the course of the process, the group is required to be properly protected prior to the execution of the reaction. For instance, the direct conversion of 16-ethylthio-4-androstene-3,17-dione into 16β-ethylthio-17β-hydroxy-4-androsten-3-one can be unsuccessfully accomplished by the application of reduction as shown above. Therefore, the latter is actually produced by reducing 3,3-ethylenedioxy-16β-ethylthio-5(6)-androsten-17-one to 3,3-ethylenedioxy - 16β - ethylthio-5(6)-androsten-17β-ol, followed by deketalation.

The starting materials, 16β-alkylthio-17-oxo-steroids (I) may be exemplified as follows:

16β-methylthioestrone,
16β-ethylthioestrone,
16β-propylthioestrone,
16b-butylthioestrone,
16β-ethylthioestrone 3-methyl ether,
16β-ethylthioestrone 3-ethyl ether,
16β-butylthioestrone 3-methyl ether,
1-methyl-16β-ethylthioestrone,
1-methyl-16β-ethylthioestrone 3-methyl ether,
1-methyl-16β-butylthioestrone 3-methyl ether,
4-methyl-16β-methylthio-1,3,5(10)-estratrien-17-one,
4-methyl-16β-ethylthio-1,3,5(10)-estratrien-17-one,
4-methyl-16β-butylthio-1,3,5(10)-estratrien-17-one,
3α-hydroxy-16β-ethylthio-5β-androstan-17one,
3β-hydroxy-16β-ethylthio-5α-androstan-17-one,
3β-hydroxy-16β-ethylthio-5(6)-androsten-17-one,
3α-hydroxy-16β-ethylthio-5(6)-androsten-17-one,
16β-ethylthio-5β-androstane-3,17-dione,
16β-methylthio-5α-androstane-3,17-dione,
16β-ethylthio-4-androstene-3,17-dione,
3,3-ethylenedioxy-16β-ethylthio-5(6)-androsten-17-one, etc.

These 16β-alkylthio-17-oxo-steroids (I) are unknown compounds and can be prepared by reacting the corresponding 16α- or 16β-halogeno-17-oxo-steroids, which are generally known [e.g. Fried et al.: U.S. Patents Nos. 2,857,403 and 2,831,872; Ellis et al.: J. Chem. Soc., p. 800 (1958); Fajkos et al.: Chemical Abstracts, vol. 53, p. 4349 (1959); Johnson et al.: J. Am. Chem. Soc., vol. 79, p. 2005 (1957)], with alkali metal lower alkylmercaptide in an inert organic solvent medium at a temperature from room temperature to reflux temperature.

According to the process of the present invention, the 16β-alkylthio-17-oxo-steroid (I) is reacted with a reducing agent such as an alkali metal hydride complex (e.g. lithium aluminum hydride, sodium borohydride) and a combination of an alkali metal (e.g. metallic sodium, metallic potassium) with a lower alkanol (e.g. methanol, ethanol) to give the 16β-alkylthio-17β-hydroxy-steroid (II). The reaction may be performed according to the procedure ordinarily adopted en the use of each of the said reducing agents. For instance, when lithium aluminum hydride is employed, the reaction is executed by treating the 16β-alkylthio-17-oxo-steroid (II) with the reducing agent in an inert organic solvent medium (e.g. ether, tetrahydrofuran, dioxane) at room temperature (15 to 30° C.). The above-prepared 16β-alkylthio-17β-hydroxy-steroid (II), if necessary, may be subjected to acylation on the 17-hydroxyl group by a per se conventional procedure to give the 16β-alkylthio-17β-acyloxy-steroid (III). For instance, the acylation can be readily carried out by treating the 16β-alkylthio-17β-hydroxy-steroid (II) with a lower alkanoic anhydride (e.g. acetic anhydride, propionic anhydride) and an organic base (e.g. pyridine, picoline) while refluxing.

The thus-produced 16β-alkylthio-17β-hydroxy-steroid (II) and its acylate (III), are specifically exemplified as follows:

16β-methylthioestradiol,
16β-ethylthioestradiol,
16β-propylthioestradiol,
16β-butylthioestradiol,
16β-ethylthioestradiol methyl ether,
16β-ethylthioestradiol methyl ether 17-acetate,
16β-ethylthioestradiol ethyl ether,
16β-butylthioestradiol methyl ether,
1-methyl-16β-ethylthioestradiol,
1-methyl-16β-ethylthioestradiol methyl ether,
1-methyl-16β-butylthioestradiol methyl ether 17-acetate,
4-methyl-16β-methylthio-1,3,5(10)-estratrien-17β-ol,
4-methyl-16β-ethylthio-1,3,5(10)-estratrien-17β-ol 17-acetate,
4-methyl-16β-butylthio-1,3,5(10)-estratrien-17β-ol 17-propionate,
3α-hydroxy-16β-ethylthio-5β-androstan-17β-ol,
3β-hydroxy-16β-ethylthio-5α-androstan-17β-ol,
3β-hydroxy-16β-ethylthio-5(6)-androsten-17β-ol 3-acetate,
3β-hydroxy-16β-ethylthio-5(6)-androsten-17β-ol 3,17-diacetate,
3α-hydroxy-16β-ethylthio-5(6)-androsten-17β-ol 3-acetate,
16β-ethylthio-17β-hydroxy-5β-androstan-3-one,
16β-ethylthio-17β-hydroxy-5β-androstan-3-one 17-acetate,
16β-methylthio-17β-hydroxy-5α-androstan-3-one
16β-ethylthio-17β-hydroxy-4-androsten-3-one,
16β-butylthio-17β-hydroxy-4-androsten-3-one 17-acetate,
3,3-ethylenedioxy-16β-ethylthio-5(6)-androsten-17β-ol 17-acetate, etc.

These products (IV) generally show a variety of physiological activities. For instance, 16β-ethylthioestradiol methyl ether produced significant inhibition of gonadotrophin secretion without any concomitant androgenic response, when orally administered to female-castrated male parabionts of mice at a total dose of 1 milligram. The said substance also showed lipid shifting activity in the test using rats and uterotropic activity in the test using mice. Further, for instance, 16β-ethylthio-17β-hydroxy-4-androsten-3-one showed Na-retaining activity by itself, when subcutaneously administered to rats at a total dose of 5 milligrams. The other products possess the similar physiological activities. Accordingly, they are useful as artificial hormonic agents.

The following examples set forth illustratively presently-preferred embodiments of the invention. In these examples, the abbreviations are intended to have conventional meanings: e.g. g., gram(s); mg., milligram(s); ml., millilitre(s); ° C., degrees centigrade.

Example 1

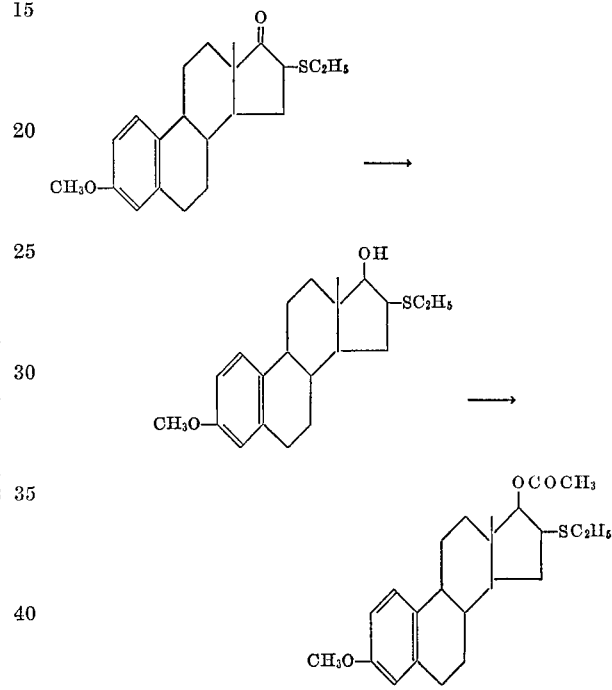

A solution of 16β-ethylthioestrone methyl ether (500 mg.) in anhydrous tetrahydrofuran (40 ml.) is added dropwise to a suspension of lithium aluminum hydride (250 mg.) in anhydrous ether (50 ml.) at room temperature (15 to 30° C.). The resultant mixture is refluxed for 2.5 hours. To the reaction mixture, there is added water and then shaken with ether. The ether extract is washed with water, dried and evaporated. The residue is crystallized from ethanol to give 16β-ethylthioestradiol methyl ether (450 mg.) as white scales melting at 127.5 to 128.5° C.

$[\alpha]_D^{21}$ +35.3° (CHCl$_3$). $\lambda_{max.}^{ethanol}$ m$\mu$($\epsilon$): 279 (2,110), 287 (1,960). $\nu_{max.}^{Nujol}$ 3500~3460 cm.$^{-1}$ Analysis.—Calcd. for C$_{21}$H$_{30}$O$_2$S: C, 72.78; H, 8.72; S, 9.25. Found: C, 73.02; H, 8.90; S, 9.19.

A solution of the above obtained 16β-ethylthioestradiol methyl ether (100 mg.) in pyridine (1 ml.) and acetic anhydride (1 ml.) is refluxed for 2 hours. The reaction mixture is condensed under reduced pressure. The residue is crystallized from a mixture of ether and methanol and recrystallized from a mixture of acetone and hexane to give 16β-ethylthioestradiol methyl ether 17-acetate (90 mg.) as crystals melting at 82.5 to 83.5° C.

$[\alpha]_D^{24}$ +96.0° (CHCl$_3$). $\lambda_{max.}^{ethanol}$ m$\mu$($\epsilon$): 208 (24,200), 279 (2,120), 287.5 (1,980). $\nu_{max.}^{carbon\ tetrachloride}$ 1740, 1614, 1503, 1239 cm.$^{-1}$ Analysis.—Calcd. for C$_{23}$H$_{22}$O$_3$S: C, 71.10; H, 8.30; S, 8.33. Found: C, 71.10; H, 8.41; S, 8.28.

The starting material of this example, 16β-ethylthioestrone methyl ether, is prepared from 16α-bromoestrone methyl ether [Johnson et al.: J. Am. Chem. Soc., vol. 79, p. 2005 (1957)] according to the following scheme:

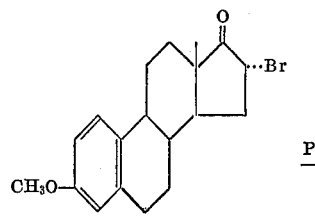

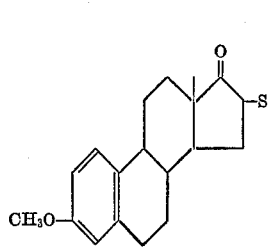

Example 2

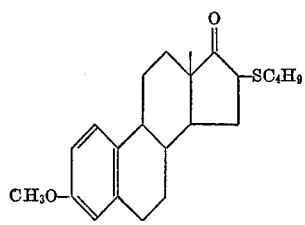

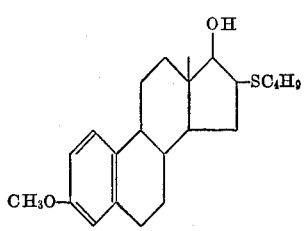

A solution of 16β-butylthioestrone methyl ether (0.2 g.) in anhydrous ether (20 ml.) is added dropwise to a suspension of lithium aluminum hydride (100 mg.) in anhydrous ether (10 ml.) at room temperature (15 to 30° C.). The resultant mixture is refluxed for 3 hours. To the reaction mixture, there is added water and then shaken with ether. The ether extract is washed with water, dried and evaporated. The residue is crystallized from a mixture of ether and hexane (1:3) to give 16β-butylthioestradiol methyl ether (168 mg.) as white plates melting at 74.5 to 75.5° C.

$[\alpha]_D^{25}$ +9.7° (CHCl$_3$). $\lambda_{max}^{ethanol}$ m$\mu$($\epsilon$): 278.5 (2,220), 287 (2,010), 308 (83). $\nu_{max}^{carbon\ tetrachloride}$ 3440, 1615, 1505, 1260, 1240 cm.$^{-1}$

*Analysis.*—Calcd. for C$_{23}$H$_{34}$O$_2$S: C, 73.75; H, 9.15; S, 8.56. Found: C, 73.56; H, 9.13; S, 8.56.

The starting material of this example, 16β-butylthioestrone methyl ether, is prepared from 16α-bromoestrone methyl ether according to the following scheme:

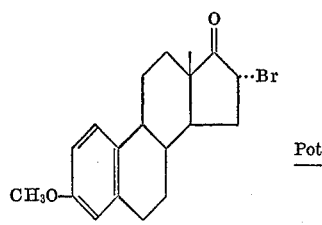

Potassium butylmercaptide →

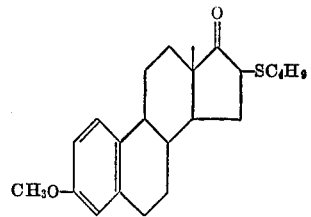

Example 3

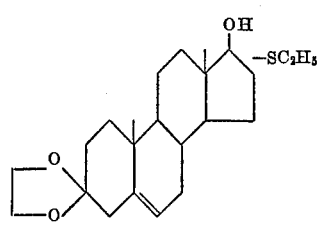

To a solution of 3,3-ethylenedioxy-16β-ethylthio-5(6)-androsten-17-one (788 mg.) in ethanol (40 ml.), there is added sodium borohydride (200 mg.), and the resultant mixture is stirred for 2 hours at room temperature (15 to 30° C.). Water is added to the reaction mixture and shaken with chloroform. The chloroform extract is washed with water, dried and evaporated. The residue is crystallized from ethanol to give 3,3-ethylenedioxy-16β-ethylthio-5(6)-androsten-17β-ol (568 mg.) as long needles melting at 203 to 205° C.

$[\alpha]_D^{21}$ −72.1±2° (CHCl$_3$). $\nu_{max}^{Nujol}$ 3510, 1672 cm.$^{-1}$

*Analysis.*—Calcd. for C$_{23}$H$_{36}$O$_3$S: C, 70.36; H, 9.24; S, 8.17. Found: C, 70.15; H, 9.23; S, 8.13.

The starting material of this example, 3,3-ethylenedioxy-16β-ethylthio-5(6)-androsten-17-one, is prepared from 16β-bromo-4-androstene-3,17-dione [Fajkos et al.: Chemical Abstracts, vol. 53, p. 4349 (1959)] according to the following scheme:

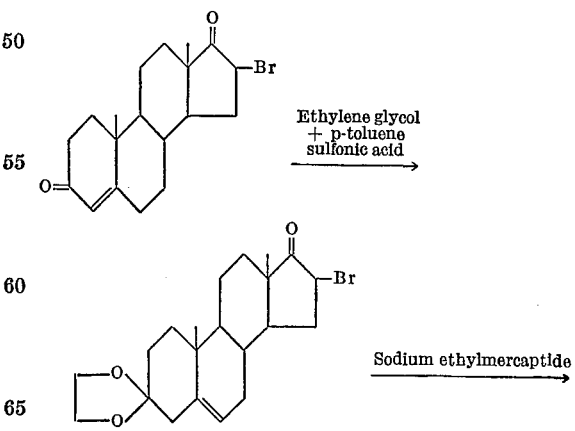

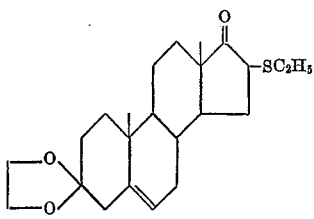

EXAMPLE 4

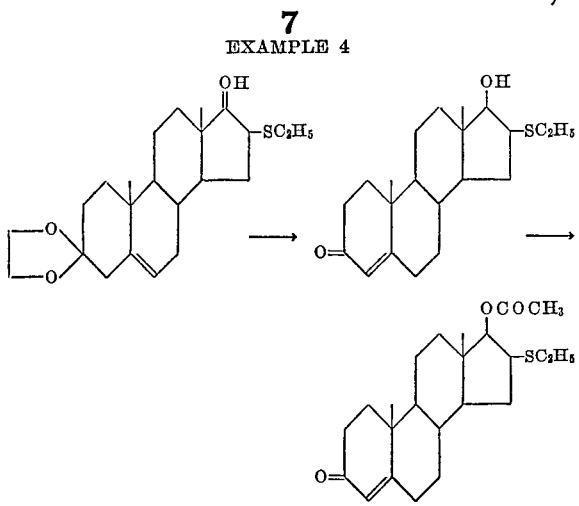

Example 4

3,3-ethylenedioxy - 16β - ethylthio-5(6)-androsten-17β-ol (568 mg.) is refluxed with p-toluenesulfonic acid hydrate (60 mg.) and acetone (20 ml.) for 2 hours. Water is added to the reaction mixture. The separated crystals are collected by filtration and recrystallized from aqueous methanol to give 16β-ethylthio-17β-hydroxy-4-androsten-3-one (509 mg.) as needles melting at 147 to 149° C.

$[\alpha]_D^{21}$ +39.2 ±2° (CHCl$_3$).  $\lambda_{max.}^{ethanol}$ mμ (ε): 242 (17,800). $\nu_{max.}^{Nujol}$ 3515, 1676, 1622 cm.$^{-1}$

*Analysis.*—Calcd. for C$_{21}$H$_{32}$O$_2$S: C, 72.36; H, 9.25; S, 9.20. Found: C, 72.31; H, 9.30; S, 9.36.

The above obtained 16β-ethylthio-17β-hydroxy-4-androsten-3-one (436 mg.) is mixed with pyridine (2 ml.) and acetic anhydride (1 ml.) and refluxed for 2 hours. The reaction mixture is condensed under reduced pressure. The residue is crystallized from aqueous methanol to give 16β-ethylthio-17β-hydroxy-4-androsten-3-one 17-acetate (368 mg.) as needles melting at 132 to 134° C.

$[\alpha]_D^{21}$ +103.6 ±2° (CHCl$_3$).  $\lambda_{max.}^{ethanol}$ mμ (ε): 241 (18,000). $\nu_{max.}^{Nujol}$ 1736, 1680, 1665 (shoulder), 1614, 1233, 1059, 1020 cm.$^{-1}$

Example 5

A solution of 1-methyl-16β-ethylthioestrone methyl ether (3 g.) in ether (130 ml.) is added dropwise to a suspension of lithium aluminum hydride (1.5 g.) in ether (150 ml.). The resultant mixture is refluxed for 3 hours. To the reaction mixture, there is added water and then shaken with ether. The ether extract is washed with water, dried and evaporated whereby 1-methyl-16β-ethylthioestradiol methyl ether (2.8 g.) is a viscous substance.

$\nu_{max.}^{carbon\ tetrachloride}$ 3520, 1605, 1586 cm.$^{-1}$

A solution of the above obtained 1-methyl-16β-ethylthioestradiol methyl ether (2.8 g.) in pyridine (20 ml.) and acetic anhydride (15 ml.) is refluxed for 2 hours. The reaction mixture is condensed under reduced pressure. The residue is dissolved in petroleum ether and chromatographed on alumina. The eluate with a mixture of petroleum ether and benzene (6:4~1:9) is crystallized from methanol to give 1-methyl-16β-ethylthio-estradiol methyl ether 17-acetate (2.20 g.) as plates melting at 86.5 to 87° C.

$[\alpha]_D^{24}$ +149.9° (CHCl$_3$).  $\nu_{max.}^{Nujol}$ 1736, 1237 cm.$^{-1}$

*Analysis.*—Calcd. for C$_{14}$H$_{34}$O$_3$S: C, 71.61; H, 8.51; S, 7.95. Found: C, 71.49; H, 854; S, 7.68.

The starting material of this example, 1-methyl-16β-ethylthioestrone methyl ether is prepared from testosterone propionate according to the following scheme:

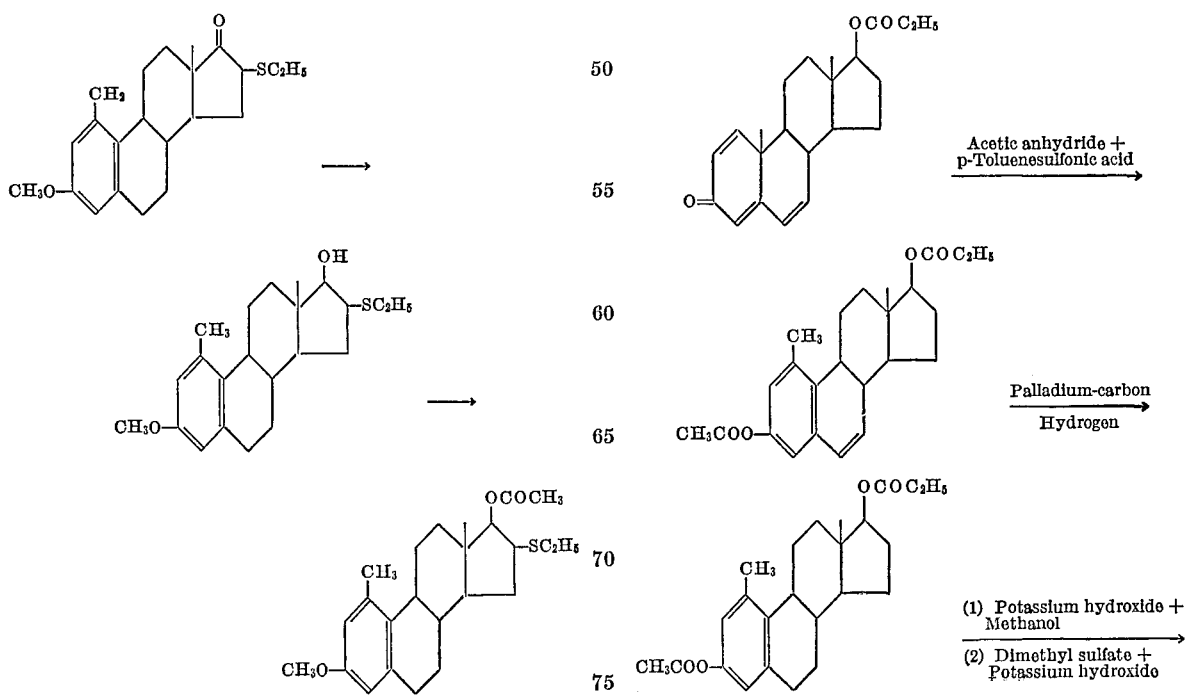

3,378,548

9

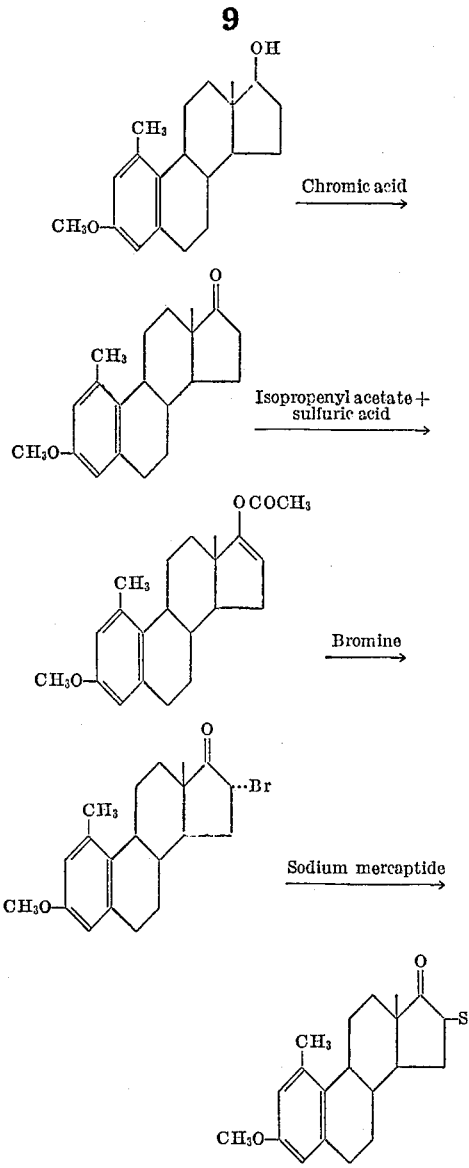

In the similar manner, there can be obtained other 16β-lower alkylthioestradiol lower alkyl ether, 16β-lower alkyl-thioestradiol lower alkyl ether 17-lower alkanoate, 3,3-lower alkylenedioxy-16β-lower alkylthio-5(6)-androsten-17-ol,16β-lower alkylthio-17β-hydroxy-4-androsten-3-one, 16β-lower alkylthio-17β-hydroxy-3-androsten-3-one 17-lower alkanoate, 1-lower alkyl-16β-lower alkylthioestradiol lower alkyl ether and 1-lower alkyl-16β-lower alkylthioestradiol lower alkyl ether 17-lower alkanoate.

What is claimed is:
1. A steroid represented by the formula:

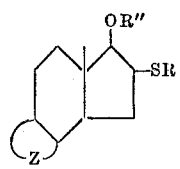

wherein R is lower alkyl, R″ is a member selected from the group consisting of hydrogen and lower alkanoyl and Z is a ring system selected from the group consisting of

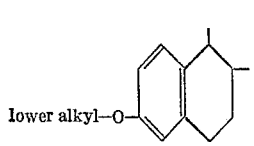 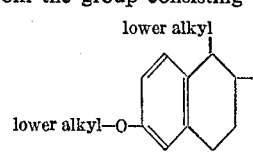

10

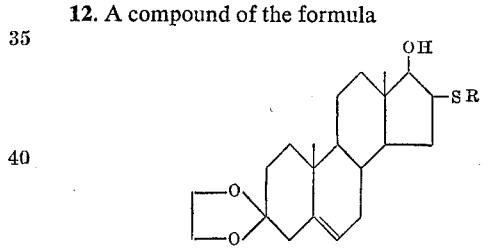

and

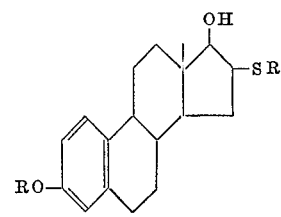

2. 16β-ethylthioestradiol methyl ether.
3. 16β-butylthioestradiol methyl ether.
4. 16β-lower alkylthioestradiol lower alkyl ether 17-lower alkanoate.
5. 16β-ethylthioestradiol methyl ether 17-acetate.
6. 3.3-lower alkylenedioxy - 16β-lower alkylthio-5(6)-androsten-17-ol.
7. 3,3 - ethylenedioxy - 16β-ethylthio-5(6)-androsten-17β-ol.
8. 1-lower alkyl-16β-lower alkylthioestradiol lower alkyl ether.
9. 1-methyl-16β-ethylthioestradiol methyl ether.
10. 1-lower alkyl-16β-lower alkylthioestradiol lower alkyl ether 17-lower alkanoate.
11. 1-methyl-16β-ethylthioestradiol methyl ether 17-acetate.
12. A compound of the formula wherein R=lower alkyl.
13. A compound of the formula wherein R=lower alkyl.
14. A compound selected from the group consisting of compounds of the formula

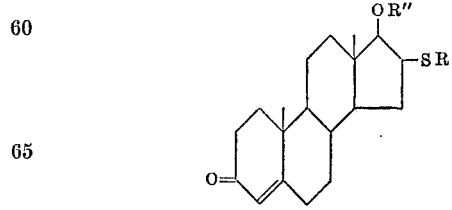

wherein R is lower alkyl and R″ is selected from the group consisting of hydrogen and lower alkanoyl.

References Cited

Fajkos et al.: Chemical Abstracts, vol. 53 (1959), p. 4349.

ELBERT ROBERTS, *Primary Examiner.*